United States Patent [19]

Caron et al.

[11]  4,445,186
[45]  Apr. 24, 1984

[54] UNDERWATER MAPPING APPARATUS AND METHOD

[75] Inventors: Roger L. Caron, Westford, Mass.; Peter J. Clifford, Barrington, R.I.; Francis R. Germain, Winchester, Mass.

[73] Assignee: EG&G, Inc., Wellesley, Mass.

[21] Appl. No.: 165,234

[22] Filed: Jul. 2, 1980

Related U.S. Application Data

[62] Division of Ser. No. 896,474, Apr. 14, 1978, Pat. No. 4,232,380.

[51] Int. Cl.$^3$ .............................................. G01D 9/00
[52] U.S. Cl. .................................... 364/521; 340/798; 364/421
[58] Field of Search .................... 340/798, 344, 347; 364/44, 521, 518–520, 523; 367/88; 358/112

[56] References Cited

U.S. PATENT DOCUMENTS

| | | | |
|---|---|---|---|
| 3,651,253 | 3/1972 | Morgand et al. | 358/112 |
| 3,787,666 | 1/1974 | Schumann et al. | 364/518 |
| 4,024,490 | 5/1977 | Wood et al. | 358/112 X |
| 4,047,147 | 9/1977 | Wood et al. | 367/88 X |
| 4,096,484 | 6/1978 | Ferre et al. | 367/88 X |
| 4,099,179 | 7/1978 | Hofstein | 367/113 X |
| 4,127,851 | 11/1978 | Middel | 364/521 X |
| 4,180,857 | 12/1979 | Yoshihara et al. | 364/519 X |
| 4,206,314 | 6/1980 | Prugh et al. | 364/520 X |
| 4,207,620 | 6/1980 | Morgera | 367/88 |
| 4,210,968 | 7/1980 | Lindseth | 364/421 X |
| 4,232,380 | 11/1980 | Caron et al. | 367/88 |
| 4,240,075 | 12/1980 | Bringol | 340/798 |
| 4,254,467 | 3/1981 | Davis et al. | 364/521 |

OTHER PUBLICATIONS

Extended Graphics ?Storage and Serialization for Non-Impact Printers, Anderson et al., IBM Technical Disclosure Bulletin, vol. 24, No. 2, Jul. 1981, pp. 1011–1016.

Rinter and/or Display System Apparatus for Forming Lines, Herrold et al., IBM Technical Disclosure Bulletin, vol. 22, No. 4, Sep. 1979, pp. 1340–1343.

Thermal Printer with In–Memory Scan–Line Composition, Markson et al., IBM Technical Disclosure Bulletin, vol. 22, No. 5, Oct. 1979, p. 2022.

Random–Access Memory Buffer for Bidirectional Serial Printer, Kohsaka et al., IBM Technical Disclosure Bulletin, vol. 20, No. 5, Oct. 1977, pp. 1798–1800.

Primary Examiner—Edward J. Wise
Attorney, Agent, or Firm—Lahive & Cockfield

[57] ABSTRACT

A method and apparatus for producing a linear plan view display of a seabed, employing a side scan sonar signal system, have circuitry for repeatedly determining the height of the transmitting source relative to the seabed, circuitry for sampling the returning sonar signals, and circuitry for providing from the height determination and the sampled signals, the slant range correction needed to provide a linear output display, at least in a direction normal to the direction of movement of the transmitting source. The preferred method and apparatus also have elements for determining the velocity of the transmitting source and for effecting a one-to-one aspect ratio linear plan view of the seabed topography. In other aspects of the invention, a method and apparatus for controlling the display and for implementing the mapping transformation are described.

2 Claims, 8 Drawing Figures

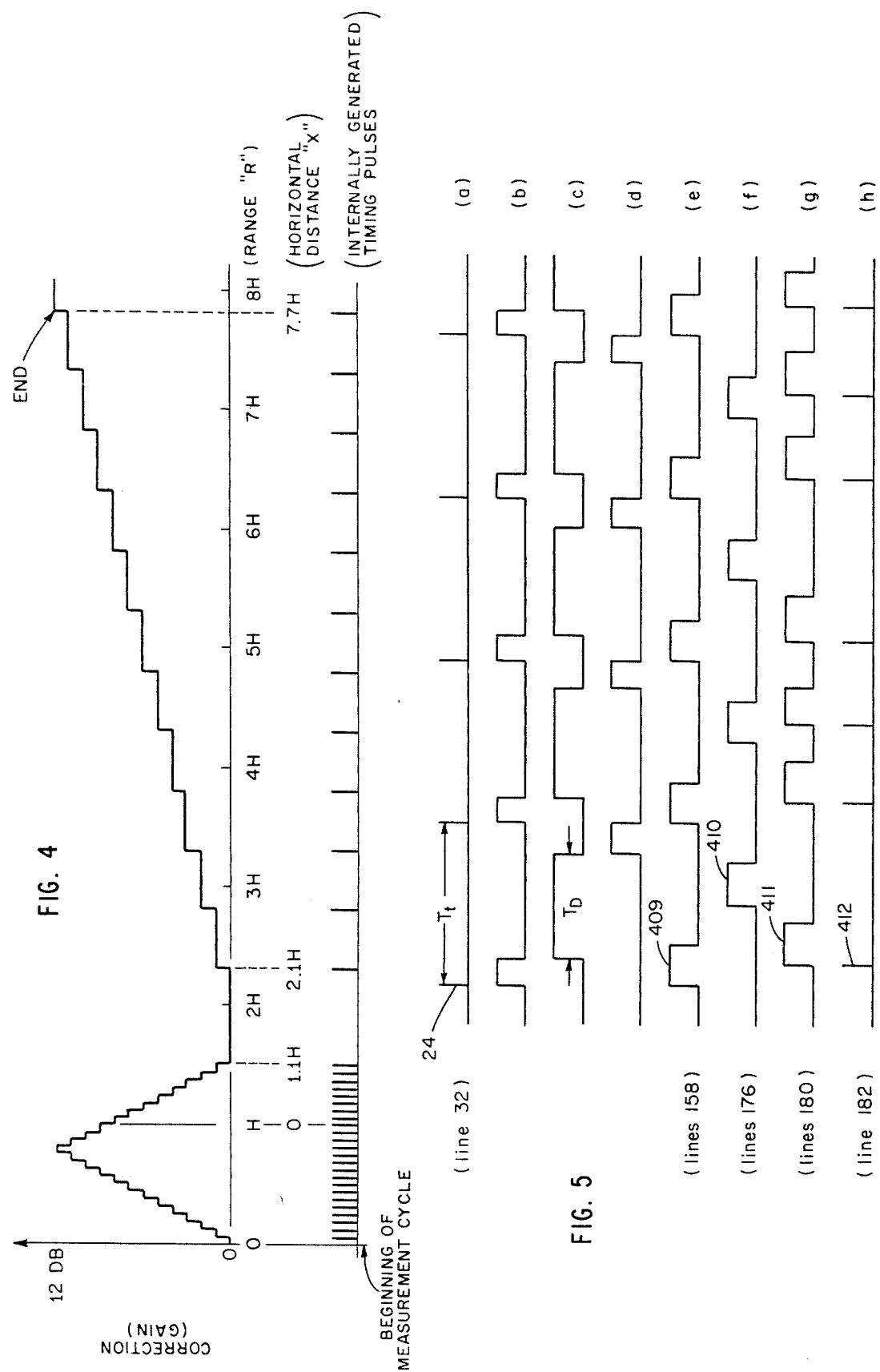

UNDERWATER MAPPING APPARATUS AND METHOD

This is a division of application Ser. No. 896,474, filed Apr. 14, 1978, now U.S. Pat. No. 4,232,380.

This invention relates generally to underwater mapping, and in particular, to an underwater mapping apparatus and method using side scan sonar techniques.

BACKGROUND OF THE INVENTION

Side scan sonar apparatus has been commerically available and in use for the past decade to provide a detailed mapping of underwater seabed topography. Typically, the apparatus comprises a sonar or acoustical transducing source and a transducing receiver, both being embodied in an underwater hull (often a submergible vehicle called a tow fish) which is maintained at a selected height above the seabed.. The received signals are converted to a format suitable for printing, and the resulting data is applied to a printer mechanism to provide a printed record. The resulting record is not a planar "picture" of the seabed topography, that is, a picture such as might be produced by an underwater camera, but is a nonlinear mapping of the seabed topography onto a planar surface. The nonlinear mapping is generally read or "interpreted" by a trained technician who is familiar with side scan sonars and the nonlinear maps they produce.

The correlation between the nonlinear mapping produced by the side scan sonar and the actual seabed topography depends upon several factors, including tow fish height, vessel velocity, and system range. Thus, an accurate interpretation of the present side scan sonar maps require not only an accurate interpretation of the received sonar data but also an appreication of the scale factors which are incorporated into the printed data. The nonlinearity and scale factor effects, some of which are selected by the operator using front panel controls, thus "distort" the maps provided by the present side scan sonar systems and makes them difficult to use and substantially impossible to combine or mosaic with each other to provide an acceptable integrated map of an area covered by plural scans. Furthermore, present side scan maps can also be inaccurate because the printed data display reflects both the height and the forward velocity of the sonar source, data which may be unavailable when the map is studied.

In another aspect of side scan sonar systems, the received acoustic data has a relatively large dynamic range, on the order of about 120 decibels, while a typical output printer has a dynamic range of only about 20 to 30 decibels. The prior art systems have thus included different configurations of externally set time varying gain amplifiers to compensate for the large dynamic range of the acoustic input signals; however, these systems have not proven totally satisfactory because they require constant manual adjustment and intervention to provide an acceptable display. Also, the resulting display may be inaccurate because the amplifiers were not correctly adjusted.

Therefore, the principal objects of the invention are a side scan sonar apparatus and method which provide a linear plan view of the seabed topography having a selected aspect ratio, which provide an improved time varying gain control system for improving the repeatability and reliability of the output record, and which provide an improved printer control. Another object of the invention is a reliable, flexible, and easy to operate side scan sonar system and method which do not require the intervention of a skilled operator.

Yet further objects of the invention are an apparatus and method which provide side scan sonar records having a controlled density and aspect ratio to enable the records to be combined with each other and provide an accurate composite picture or mosaic of the seabed topography.

Another object of the invention is a method and apparatus for enchancing the detail on the seabed.

SUMMARY OF THE INVENTION

The invention relates to an apparatus and methods for producingg a plan view display of a seabed from a side scan sonar signal system. The system includes sonar generating and receiving means which move with respect to the seabed, and wherein the display is linear, at least along an axis corresponding to a direction normal to the direction of movement of the generating and receiving means.

The apparatus further has at least one transmitting transducer assembly for repeatedly generating side scan sonar signals in response to a trigger signal, the trigger signals each defining the beginning of a measurement cycle; at least one receiving transducer assembly for providing a received electrical signal output, the output having an amplitude corresponding to the intensity of the received returning sonar signals, means responsive to the receiving transducer assembly output for providing a compressed electrical signal output having a dynamic range less than the dynamic range of the received sonar signals, and a display device for displaying the received sonar signals.

The apparatus according to the invention features a sampling means for periodically sampling the compressed electrical signals within each measurement cycle to generate a sequence of sampled signal values, a height determining means for repeatedly determining from said sampled signals the height of the source generating and receiving means with respect to the seabed, and means responsive to both the transducer height relative to the seabed and the sampled signals for generating a sequence of linear data values corresponding to a mapping of the sampled signals onto a sequence of equi-distant locations along a horizontal seabed-representing axis. A control means for actuating the display device to produce the plan view map of the seabed is provided and the display device has means for receiving and displaying the linear data.

In a preferred aspect of the invention, the apparatus further features a velocity sensing means for generating a velocity determining output signal representing the velocity of the generating and receiving means relative to the seabed, means responsive to the velocity output signal for generating a line count for each line of linear data values, and wherein the display printer control means is responsive to each line count for printing the associated sequence of linear data a number of times corresponding to the line count.

Other featues of the apparatus, according to a preferred embodiment of the invention, include an apparatus and method for making an angle correction to the sampled signal values for compensating the sonar return signal for the grazing angle of the signal relative to the seabed and for transmitting transducer non-uniformities in the vertical plane; a time varying gain amplifier having a gain corresponding substantially to the square of the elasped time measured from the time of occurrence of a last triggering pulse signal; and a height determining apparatus based upon making measurments of the port and starboard amplitude signal returns relative to a predetermined threshold.

The method according to the invention has the steps of repeatedly generating at least one side scan sonar pulse signal from at least one transmitting transducer, each pulse signal marking the beginning of a new measurement cycle; receiving returning sonar signals with at least one receiving transducer and converting the received sonar signals to a received electrical signal output having an amplitude corresponding to the intensity of the received returning sonar signals; and reducing the dynamic range of the received electrical signals thereby providing a compressed electrical signal output of reduced dynamic range. The method further featues the steps of periodically sampling the compressed electrical signal within each measurement cycle for generating a sequence of sample signal values; determining from the sample values the height of the transmitting and receiving means above the seabed; generating from the sample values a sequence of linear data values which correspond to a mapping of the sampled signals onto a sequence of equi-distant locations along a horizontal seabed-representing axis, said generating step being responsive to the height of the transmitting and receiving means above the seabed; and displaying the linear data on a dispaly device for producing said plan view display of seabed topography.

In a preferred aspect of the method of the invention, there are further featured the steps of repeatedly determining the velocity of the transmitting transducer relative to the seabed; generating a line count therefrom associated with each line of the linear data; and displaying each said line of linear data a number of times determined by the associated line count.

In yet another aspect of the invention, a display apparatus for displaying successive lines of data has a storage means for storing each successive line of data, means for forming a line count associated with each line of data, and means for displaying each successive line of data in a number of successive lines of said display, said number of lines corresponding to said line count.

The invention further features the method and apparatus wherein said sampled signals within each measurement cycle are denoted by $S(n)$, $n=0, 1, 2, \ldots, N$; said determined height is $h$; and the range from the generating and receiving means to a position on the seabed corresponding to the sampled signal $S(n)$ is $R_n$. The linear data generating means then comprises means for forming an error function $e'$ or $e$, substantially of the form $$e'_{n,x} = \sum_{i=1}^{x} i - \sum_{j=H+1}^{n} j$$

or $$e_{n,x} = \sum_{i=1}^{x} (2i-1) - \sum_{j=H+1}^{n} (2j-1)$$

where $n=1,2,\ldots,N$;

$$H = \frac{h \cdot N}{R_N};$$

and $x=0, 1, 2, \ldots$, and means for generating the linear data $S_1(x)$, $x=0, 1, 2, \ldots$, according to the rule $S_1(x)=S(n)$ for all x and n so that either $e'_{n,x}<0$ and $e'_{n-1,x}>0$ (which can also be written as $e'_{n,x}<0 \leq e'_{n-1,x}$) or $e_{n,x}<0$ and $e_{n-1,x}\geq 0$ (which can also be written as $e_{n,x}<0\leq e_{n-1,x}$).

DESCRIPTION OF THE DRAWINGS

Other objects, features, and advantages of the invention will appear from the following desciption of a preferred embodiment taken together with the drawings, in which:

FIG. 2, having two parts.

FIG. 4 is a graph of angle correction versus time for the illustrated embodiment of the invention;

FIG. 5 is a timing chart for the illustrated embodiment of the invention;

DESCRIPTION OF A PREFERRED EMBODIMENT

Figure 1:
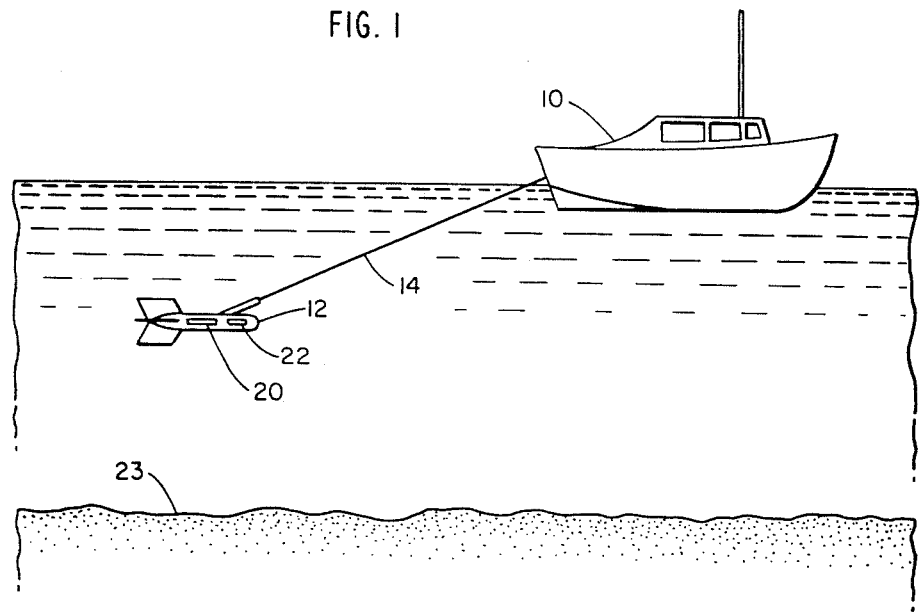
FIG. 1 is a side elevation view of a typical side scan sonar system configuration.

Referring to FIG. 1, a typical side scan sonar apparatus includes a vessel 10 towing a tow fish 22. The tow fish is connected to the vessel 10 through an electromechanical cable 14. The tow fish includes port and starboard transmitting trahsducers 20, which generate, on command from the vessel, the port and starboard side scan sonar acoustic output signals, and port and starboard sonar receiving transducers 22 which convert received sonar signals into received electrical signals. In the preferred embodiment, the receiving and transmitting transducers for each side of the tow fish are combined in a single transducing element. For ease of reference, however, they shall continue to be referred to separately both in this description and in the claims.

Typically, transmitting transducers 20 emit directed acoustical pulse signals, one acoustical signal being directed to the starboard side of the tow fish and a second acoustical signal being directed to the port side of the tow fish. The acoustical signals are each substantially planar, are oriented in a vertical plane, and are directed toward the seabed 23.

The port and starboard transmitted acoustical signals radiate outward from the transducer sources. When the signals impinge upon a reflecting surface, which may be, for example, a fish or the seabed, a portion of the incident energy is reflected and in substantially all instances some will be reflected towards the receiving transducers. These backscattered acoustical signals are received by the port and starboard receiving transducers 22 on board the tow fish, are converted into electrical signals, and are delivered to electronic equipment on board the vessel 10.

In general, as is well known in the art, the energy intensity of the sonar signals will vary as a function of many factors. The factors include the distance traveled through the water (absorption loss and beam spreading), the reflection surface area, the environmental conditions in the water, the nature of the seabed, the objects on the seabed, the grazing angle, and the spatial non-uniformity of the transmitted signal. As a result of those factors which depend upon the distance traveled by the sonar signal, the returning sonar signals have a substantial dynamic range, on the order of 120 decibels or more. Consequently, as described below, the received signals must be compensated and compressed, in dynamic range, to provide an output signal properly matched to a printing device on board the vessel having a dynamic range of about 20 to 30 decibels.

Figure 2A:
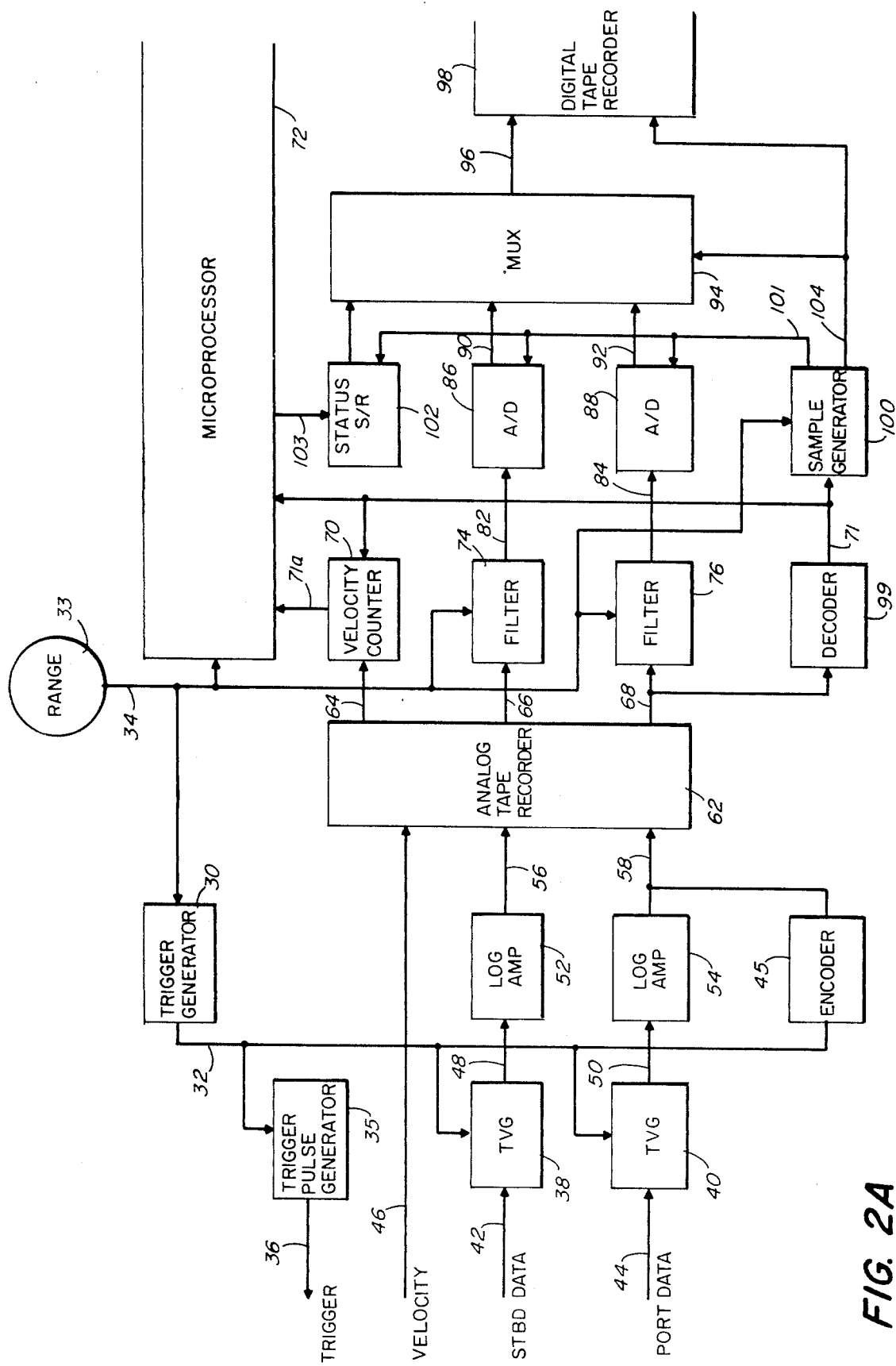
FIGS. 2A and 2B, is an electrical block schematic representing the signal flow through the electrical circuitry on board the vessel according to the invention.
Figure 2B:
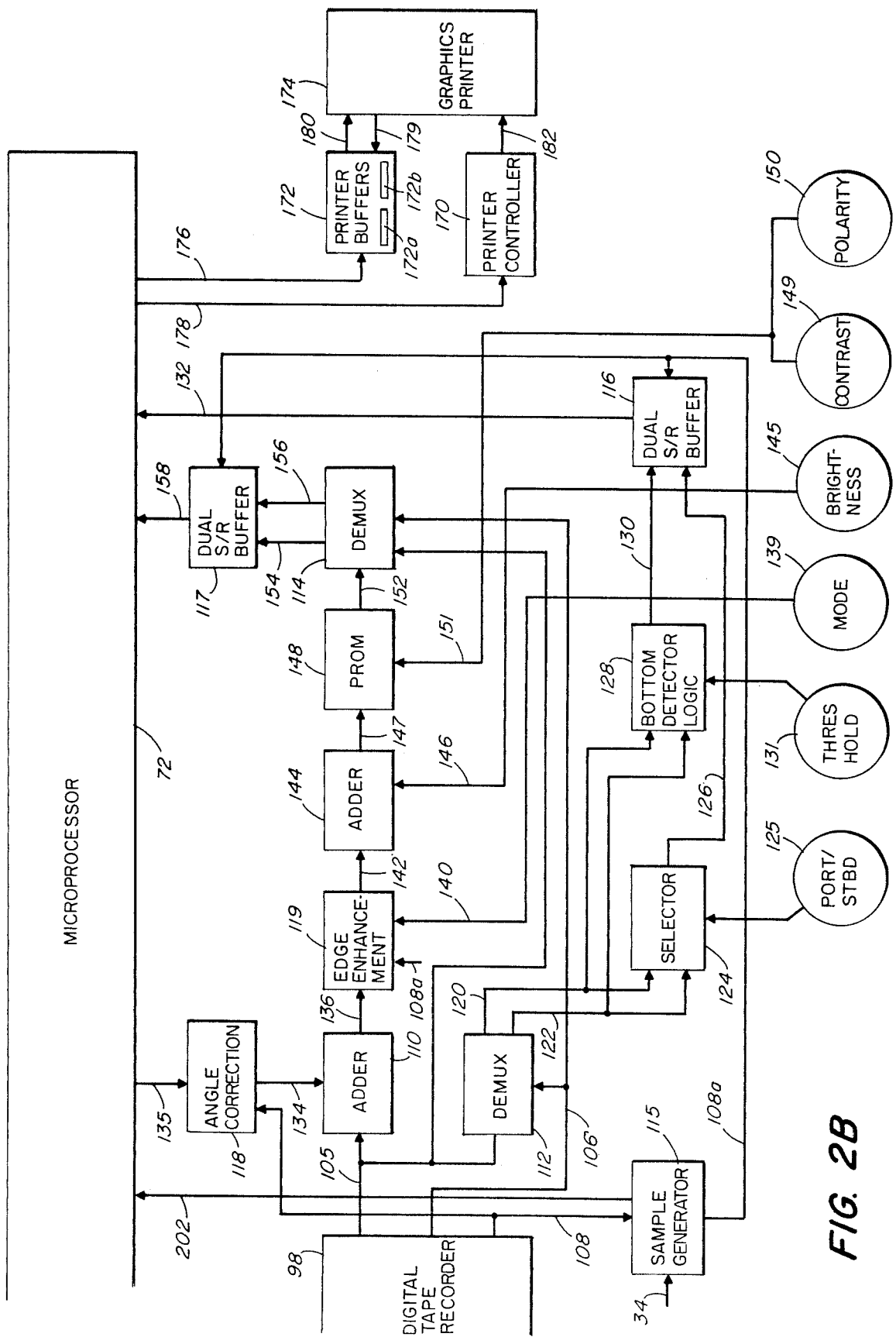

Referring to FIG. 2, the electronic equipment in the illustrated embodiment includes a microporcessor 20 which implements, in software, several often used arithmetic logic functions and administrative or housekeeping duties. These functions and duites can be implemented also in hardware; however, the microprocessor is used, and preferred, because it provides a significant cost advantage and flexibility over the hardware implementation. As will be obvious to one skilled in the art, many of the hardware functions described hereinafter in connection with the electronic equipment of FIG. 2 can be implemented also in the software in, for example, a microprocessor. However, to operate the entire electronics control and signal processing system in real time, the trade-off and separation of functions described below appear to be most desirable.

Referring to FIG. 5, a measurement cycle is defined by the time duration between measurement cycle start pulses 24. During that time duration a pulse output signal is initiated from transmitting transducers 20 and the reflected return signals are received by receiver transducers 22. Simultaneously, as described below, data tarnsfer is being effected to and from the microprocessor and printer data is being generated.

The operation of the electronics equipment, according to the invention, is initiated by the measurement cycle start signal pulse 24 which is generated by a trigger generator 30 over a line 32. The repetition rate at which start signal pulses 24 appear over line 32 is determined by generator 30 in response to the selected range over which the sonar is to be operated. The range is set by an external control 33 connected to generator 30 over a line 34. Control 33 is typically located on a front panel (not shown).

Each start pulse over line 32 therefore signals the beginning of a measurement cycle. Each start signal pulse over line 32 initiate a trigger pulse from a trigger pulse generator 35, and the trigger pulse is applied to line 36 for initiating a sonar signal pulse output from the tow fish transmitting transducers 20. The start pulse over line 32 also initiates operation of time varying gain amplifiers 38 and 40 which provide, respectively, the initial input data signal compression for the analog starboard and port return signals over lines 42 and 44 from the tow fish over cable 14. An encoder 45 also receives the signal start pulse.

In addition to providing the port and starboard data over lines 44 and 42, the two fish is further equipped, according to the illustrated embodiment, with a commercially available velocity sensor, whose output is available over a line 46. The velocity sensor provides a pulse signal over line 46 and the tow fish velocity is determined by the repetition rate of the analog pulse signal. Thus, each pulse represents a known distance of tow fish travel.

Time varying gain (TVG) amplifiers 38 and 40 are well known in the art. They are adapted to reduce the dynamic amplitude range of the received input analog data over lines 42 and 44 from respectively the starboard and port sides of the sonar receivers on the tow fish. According to the illustrated embodiment, TVG ampplifiers 38 and 40 advantageously provide output signals over lines 48 and 50 respectively according to a preprogrammed gain which is a selected function of time. Thus, while time varying gain amplifiers for use in connection with this invention may be any of those known in the art, A particularly preferred amplifier is described in copending patent application Ser. No. 896,240 (now U.S. Pat. No. 4,198,702), filed on even data herewith, and whose disclosure is incorporated herein by reference. The illustrated TVG amplifiers 38, 40, in response to each cycle start pulse signal over lines 32 from trigger generator 30, initiate a preset time varying gain which is adapted from the well known sonar signal equation (as described for example in Urick, Principles of Underwater Sound, 2nd Ed., McGraw-Hill, 1975, section 8.5). The TVG amplifiers accordingly provide a lower gain for early return signals (signals received closer to the time at which the pulse generator initiates the sonar source acoustic output), and a greater gain for return signals from later returning signals (signals returning from more distant locations). Thus, to first order, amplifiers 38 and 40 compensate for the attenuation caused by the passage of acoustic energy through a fluid medium (water) and the effect of beam spreading. The signal output of the TVG amplifiers typically has a dynamic range of less than 60 decibels. The detailed operations of illustrated TVG amplifiers 38, 40 is described in copending application Serial No.

In the illustrated embodiment, logarithmic amplifiers 52, 54 receives the outputs of TVG amplifiers 38, 40 over lines 48, 50 respectively and provide output signals over lines 56, 58. The logarithmic amplifiers 52 and 54 provide a voltage output which corresponds to the logarithm of the respective voltage inputs. Also, the effective dynamic range of the port and starboard data signals is further reduced to about 35 decibels.

The logarithmic output signals have two important advantages in addition to a further reduced dynamic range. Most importantly, the logarithmic amplifiers provide an output signal in which equal amplitude changes correspond to equal visual brightness change signals over lines 48 and 50, as those changes are perceived by the human eye. This increases the quality of the output record. Second, by processing the logarithm of the received signal, multiplicative adjustment, such as gain corrections, are more conveniently made by an additive translation of the logarithmic signal. (It will be recalled that $\log x \cdot y = \log x + \log y$.)

In addition to the logarithmic port signal data provided by logarithmic amplifier 54 on line 58, the encoder 45 provides, in response to the trigger signal over line 32, an encoded signal multiplexed onto line 58. In this embodiment, the "multiplexing" consists of connecting the encoder output directly to line 58. The encoded signal is employed later, in the illustrated embodiment, to designate the time at which the cycle initiating trigger pulse occurred and hence to identify the beginning of each side scan measurement cycle.

The logarithmic analog data over lines 56 and 58 and the velocity data pulse signal over line 46 are received and recorded, in the illustrated embodiment, by a multi-track analog tape recorder 62 for later playback, The analog tape recorder input signals are also available, after a fixed delay set by the tape recorder, over lines 64, 66, and 68. (The read heads of the analog tape recorder provide the delayed output by reading the signals previously written onto the multi-track analog tape recorder.) Alternatively, if the analog tape recorder is not employed, lines 46, 56, and 58 can be connected directly to lines 64, 66, and 68 respectively.

The velocity data is provided from the tape recorder over line 64 and is applied to a counter 70. Counter 70 repeatedly provides at the beginning of each measurement cycle in response to a timing signal over a line 71 generated as described in detail below, and over a line 71a, a binary output representing the cumulative number of count pulses received over line 64. The binary count over line 71a is applied to a microprocessor unit 72 which takes the difference between successively applied counts to determine the tow fish velocity. The microprocess unit 72 may be any of those commercially available and in the illustrated embodiment is a type 8080 available from Intel.

The starboard and port data from the analog tape recorder 62 over lines 66 and 68 are applied to low pass filter elements 74 and 76 respectively. Filter elements 74 and 76 apply filtered output signals over lines 82 and 84 to analog to digital (A/D) converters 86 and 88 respectively. Converters 86 and 88 apply their digital outputs, over lines 90 and 92 respectively, to a multiplexing unit 94, and multiplexing unit 94 preferably applies its output over lines 96 to a digital tape recorder 98.

Control settings for the portion of the electrical circuitry between the analog and digital tape recorders are determined by the manually adjusted external range control 33 in combination with a data decoder circuit 99. The data decoder 99 receives the port data from the analog tape recorder, decodes the signals provided by encoder 45, and repetitively provides output signal pulses over line 71 to a sample generator 100 and to the counter 70. Those signal pulses correspond to and identify the beginings of the measurement cycles. The range control provides signal levels over its control line 34 for fixing the bandwidth of filters 74 and 76.

The sample generator, in response to the decoder output signal over line 71 (corresponding to the beginning of a measurement cycle), provides a sample pulse train over a line 101, the pulses beginning at a fixed time after the occurrence of the decoder output over line 71, and having in the illustrated embodiment a fixed repetition rate. The sample pulse signals are thus equally spaced and correspond to taking a preselected number of samples over the minimum range setting for the apparatus. In the illustrated embodiment, 900 samples are taken over the preselected range; however, in other embodiments of the invention other sampling procedures can be adapted.

As is well known in the art, the rate at which a signal is sampled determines the maximum bandwidth signal which can be reconstructed from the sampled data without distortion. This is the Nyquist sampling theorem. The filter elements 74 and 76 are thus configured to have a bandwidth which is variable in response to the range control signal on line 34; so that the signal-to-noise ratio and distortion of the port and starboard data is minimized. The filter bandwidth of each element is then set equal to $S/2T_o$ where $T_o$ is the round trip time of an acoustic signal to the set range and S equals the number of samples in the time interval $T_o$ (S, as noted aboe, equals 900 in the illustrated embodiment). This then, in the illustrated embodiment, fixes the maximum resolution of the port and starboard data. It also reduces noise in the data and eliminates what may be seen as distortion when the data is printed.

The output of filters 74 and 76 are sampled by the A/D converters 86 and 88 respectively at times corresponding to each sample pulse over line 101. In the illustrated embodiment, each converter provides a six-bit binary output representing the input signal value.

The sample pulse signals over line 101 also actuate a status shift register 102 which has been previously loaded with binary data, developed and formatted by the microprocessor 72, to represent the settings of the equipment and to provide status information. Shift register 102 is loaded from microprocessor 72 over a line 103. The binary data from register 102 represents, inter alia, the time and data of the measurement, the tow fish vlocity, etc., and is preferably provided in a binary coding. Preferably a seven bit binary word, which represents two four-bit BCD words, is used. The data is printed on the resulting plan view of the sea bottom.

Sample generator 100 also provides a clock pulse output over a line 104 to multiplexing unit 94 and the digital tape recorder 98. The repetition rate of the clock pulse signal over line 104 is twice that of the pulse signal over line 101 for reasons which will become clear later.

Multiplexing unit 94 combines the outputs of the shift register 102 and the A/D converters 86, 88 and provides the ilustrated digital tape recorder with eight-bit input words over lines 96, for recording and later playback as follows.

Referring to the timing chart of FIG. 5, each measurement cycle duration can be viewed as containing a sequence of three non-overlapping time intervals. During the first interval (line (b)), the acoustic signal travels from the tow fish, to the nearest signal return surface of interest, that is, the seabed beneath the tow fish, and returns. During the second interval (line (c)), designated $T_D$ in the figure, valid returning sonar signals are being received and port and starboard data is processed. The end of this second interval is set by the range control. The remaining the time interval (line (d)), represents the time needed to transmit status information.

The last interval is thus employed for transmitting binary data representing status information from register 102 to the rest od the processing system. In the illustrated embodiment, thirty-two eight-bit words, each containing seven bits of binary information and one flat bit, are generated by the multiplexer 94 at the end of each measurement cycle. During the second time interval, return signal amplitude data is processed.

The multiplexer 94 formats the status register data and the port and starboard data from the A to D converters for recording by the tape recorder. The binary output of the status shift register is provided seven bits at a time (corresponding to two BCD characters) and the A/D output is a six-bit binary number. The illustrated tape recorder can record eight-bit data. Hence, as a bookkeeping device, to be used ltaer to sort out the data, multiplexer 94 places the A/D data information in the six least significant bits (seven least significant bits for the status data) of the recorder word and designates the contents of the word by a code placed in the most significant bit. Thus, for example, the most significant bit can designate status data or A/D output data and in the case of A/D output data, the second most significant bit can distinguish the port and starboard data. It will be apparent to one skilled in the art that the tape clock signal (over line 104) must be twice the sample pulse rate (over line 101) to maintain synchronism between the incoming port and starboard data and the processing of that data, in real time, by the microprocessor.

For operating the apparatus in real time, a delayed version of the digital input data is provided over lines 105 and 106, and clock or strobe signals corresponding to each recorded word, are provided over a line 108. Alternatively, if the tape recorder is not used, lines 96 and 104 can be connected directly to lines 105/106 and 108 respectively.

Each eight-bit tape output data word is divided so that the six least significant bits are available over lines 105 (to a binary adder 110 and to demultiplexing units 112 and 114) and the two most significant bits of each tape output data word, the bits which designate the class or type of data information carried by the word (port, starboard, or status information) are available over lines 106 to demultiplexers 112 and 114. (When the most significant bit designates a status word, the second most significant bit represents part of the binary data.) The clock strobe from the tape recorder over line 108 connects to a second sample generator 115 and an angle correction circuit element 118. Sample generator 115 provides a clock output signal over lines 108a to dual shift register buffers 116, 117, and an edge enhancement circuit element 119.

The second sample generator 115 in response to the clock signals over line 108 provides a pulse train over line 108a which is determined by a range control input from control 33 over lines 34. In the illustrated embodiment, the range is restricted to be substantially an integer multiple of the minimum range from which the original sampling rate was set. Thus, if the range were set to twice the minimum range, the pulse rate output from generator 115 would be one-half the original pulse rate and one-half of the sampled data would be discarded. However, since the data is formatted so that port and starboard data alternate on lines 105, the pulses on line 108a are not equally spaced. In other embodiments, various other techniques for recovering the sampled data can be used to provide greater flexibility in setting the range.

As will be obvious to those skilled in the art, by following the techniques outlined above, some or most of the status data can be lost. Thus, the generator 115 is arranged to pass a last block of clock pulses for each measurement cycle, thirty-two in the illustrated embodiment, which preserves the integrity of the status data, as described in more detail below.

Referring first to the data processing channel which begins with the demultiplexer 112, the port and starboard data received over lines 105 as indicated by the selection data over lines 106, are demultiplexed or separated, and are provided with full six-bit accuracy over output lines 120, 122 respectively to a selector circuit element 124. Selector 124 is responsive to an external port/starboard switch 125, mounted on the front control panel (not shown) of the apparatus. Switch 125 selects that data (i.e. port or starboard) which will be displayed in a conventional side scan sonar plot on the output printer grahics. The output of the selector 124 over lines 126 is the three most significant data bits of the selected data, and thus provides eight levels of grey on the output display. The three-bit output is applied to and stored in the dual shift register 116, which operates as described in more detail below.

The port and starboard outputs of demultiplexer 112 are also applied to a bottom detection logic circuit 128 which provides an output, based upon which, the apparatus determines the height of the tow fish above the seabed. The determined height is used in later processing to generate angle corrections of the port and starboard input data. The illustrated bottom detection logic circuit provides a one-bit binary output signal level over a line 130 to the dual shift register 116. The one-bit output is in a first state, for example, a binary one, if the amplitude of the port and starboard data each exceed a preset threshold amplitude value, and is in the other state, that is, for example, a binary zero, if the amplitude of either of the applied port or starboard data is less than the preset threshold. The threshold is set from a front panel control 131. Circuit 128 thus requires that the intensity on the port and starboard received data each exceed a certain predetermined threshold before a binary one is output and the apparatus then operates upon the assumption that when the received data from both port and starboard channels first exceed the threshold, the reflections are coming from the seabed. The illustrated output over line 130 thus consists of a sequence of "ones" and "zeros", the sequence first maintaining a binary one level at a time which corresponds to the first received reflectios from the seabed. In this manner, return signals from water column data, such as fish, bubbles, etc. can be accommodated and an accurate determination of the tow fish height can be made.

The dual shift register buffer 116 simultaneously loads the signals over lines 126 and 130 each clock cycle (as determined by the clock over line 108a) and makes this output available to the microprocessor 72 over lines 132 during the next measurement cycle as described below. The dual shift register 116 has two shift registers so that while one register is storing the data over lines 126 and 130, the other register is providing the data stored during the previous measurement cycle to the microprocessor. Thus an successive measurement cycles, the registers alternate roles.

The second processing channel, beginning with adder element 110, provides amplitude adjusted and compensated port and starboard data to the microprocessor 72. The compressed six-bit port and starboard data provided to the adder over lines 105 is corrected according to an angle correction factor over lines 134 from correction circuit element 118. The angle correction is based upon the two fish height as determined by microprocessor 72 during the previous measurement cycle. The angle correction is made in hardware by the angle correction circuit element 118, which, in the illustrated embodiment, provides a binary number over its output lines 134 to adder 110. The output of the adder 110 equals the binary sum of the inputs over lines 104 and lines 134, and the output over the lines 136 represents the port and starboard data compensated for the grazing angle and the radiation pattern planar non-uniformities.

Angle correction element 118, in the illustrated embodiment, has an up-down counter, set to an initial count at the beginning of each measurement cycle and hard wired to follow a fixed path in response to the clock pulses over line 108. (It will be recalled that these pulses have a fixed known clock rate in the illustrated embodiment.) The output of circuit 118, as a function of the angle, α, (FIG. 3) with the horizontal is depicted in FIG. 4. Since the angle α equals arcsin h/v$_w$·t, where h is the height of the tow fish, v$_w$ is the velocity of the acoustic signal in the fluid medium and t is one-half of the round trip time, the angle correction can be calculated in a straightforward way for controlling the counter. The particular correction plotted in FIG. 4 is for the EG & G tow fish Model 272 based upon a typical sea floor model for the grazing angle.

An edge enhancement circuit 119 receives the output of adder 110 and, in the response to the position of a mode switch 139, mounted on the front panel of the apparatus, either passes the input signal unmodified or provides a differencing function to enhance the edges of the data for emphasizing objects which may otehrwise be ignored due to the relatively low contrast in the output picture. The signal from the mode switch is provided over a line 140 to the edge enhancement circuit.

The six-bit output of the edge enhancement circuit 119 over lines 142, is applied to a second binary adder 144. Binary adder 144 adds a binary number (which may be positive or negative) to each sample point thereby effecting a lightening or darkening of the output record. The brightness control 145, a manual control mounted on the front panel of the apparatus, provides a binary control signal to adder 144 over lines 146.

The six-bit output of adder 144 over lines 147 is applied to a programmable read only mmeory (PROM) 148. PROM 148 also receives binary input signals from a contrast control element 149 and a positive/negative polarity switch 150 over lines 151. Both element 149 and switch 150 are mounted on the front panel. The PROM 148, using a look-up table approach, provides a four-bit binary otput signal over lines 152 to demultiplexer 114. The output signal over lines 152 can be modified therefore to provide a positive or a negative printed record and the record can have low or high contrast as set by the continuously variable contrast control 150. PROM 148 thus effectively multiplies the incoming data (over lines 147) by a variable multilpication factor.

The output of the PROM, over lies 152, represents alternating port and starboard data and is demultiplexed by the demultiplexing unit 114. The port data is applied over lines 154 and the starboard data over lines 156 for storage in the dual shift register buffer 117. The dual shift register 117, like register 116, contains two separate shift registers so that one register can be filled while the other register is being emptied. The compensated and modified port and starboard data is thus made available to the microprocessor 72 over lines 158 during a next measurement cycle.

During that portion of the last time interval of each measurement cycle during which binary data representing the system status is being provided, demultiplexer 114, in response to the bit pattern over lines 106 accepts as its input the data over lines 105 plus the next to the most significant bit over lines 106, and provides that seven-bit data over lines 154 and 156 to the shift register 117. Thus shift register 117 provides microprocessor 72 with a "line" of data each measurement cycle, the "line" having 32 (8-bit) words of status data and the remainder of the line being alternating port and starboard amplitude data.

Microrpocessor 72 is programmed in software to produce a linear planar map, having preferably a one-to-one aspect ratio, from the compensated and modified port and starboard data received over lines 158. Microprocessor 72 simultaneously generates the status information provided over lines 103 to the status shift register 102 and in a form compatible with the eventual record printout. The microprocessor also generates, from the bottom detection logic input, the tow fish height, and makes it available over lines 135 to the angle correction circuitry 118. In addition, the microprocessor also receives, and takes into account in generating printer control signals, the velocity information from velocity counter 70 over lines 71a. In response to the data input, microprocessor 72 provides a graphics printer controller 170 and a graphics printer buffer 172 with the signal information required to operate the graphics printer 174 so that a one-to-one aspect ratio, linear plan view of the seabed is displayed. By a "linear plan view" is meant that equal distance increments along an axis of the display represent equal distance increments along the seabed (which is assumed to be horizontal). By a "one-to-one aspect ratio" is meant that equal distance increments in any direction on the display correspond to equal distance increments along the seabed.

The printer buffer 172, like dual shift registers 116, 117, has two storage elements or registers 172a, 172b so that during each measurement cycle, one register receives data while the other register makes data received during a previous measurement cycle available to the graphics printer. Thus, during each measurement cycle, microprocessor 72 provides a selected printer buffer register over lines 176 with properly formatted binary data describing the line(s) which will be printed during the next measurement cycle. In addition, the microprocessor provides the printer controller 170 with a line count designating the number of times which the binary data, provided to printer buffer 172 during that measurement cycle, will be printed during the next measurement cycle. The printer buffer, during each next measurement cycle and in response to signal pulses over a line 179 from the printer, makes available the line of data received during the previous measurement cycle to the graphics printer 174 over lines 180, and makes it available repeatedly, if necessary, a number of times corresponding to the associated line count. Thus, on alternate measurement cycles, the two buffer registers 172a, 172b of printer buffer 172 alternate functions; one buffer receiving binary data from the microprocessor while the other buffer provides binary data to the graphics printer over lines 180.

The printer controller 170 controls line operation of the graphics printer 174 by pulse signals over line 182. In response to each pulse signal over line 182, (the number of pulse signals within a measurement cycle equals the number of times that the line of data in buffer 172 is repeated), the graphics printer 174 interrogates buffer 172 over line 179, and prints the data available from the buffer over lines 180. A preferred printer is the ANAC Model 912 manufactured by ANAC of New Zealand. (ANAC has an office in California to handle business in the United States.)

Figure 6:
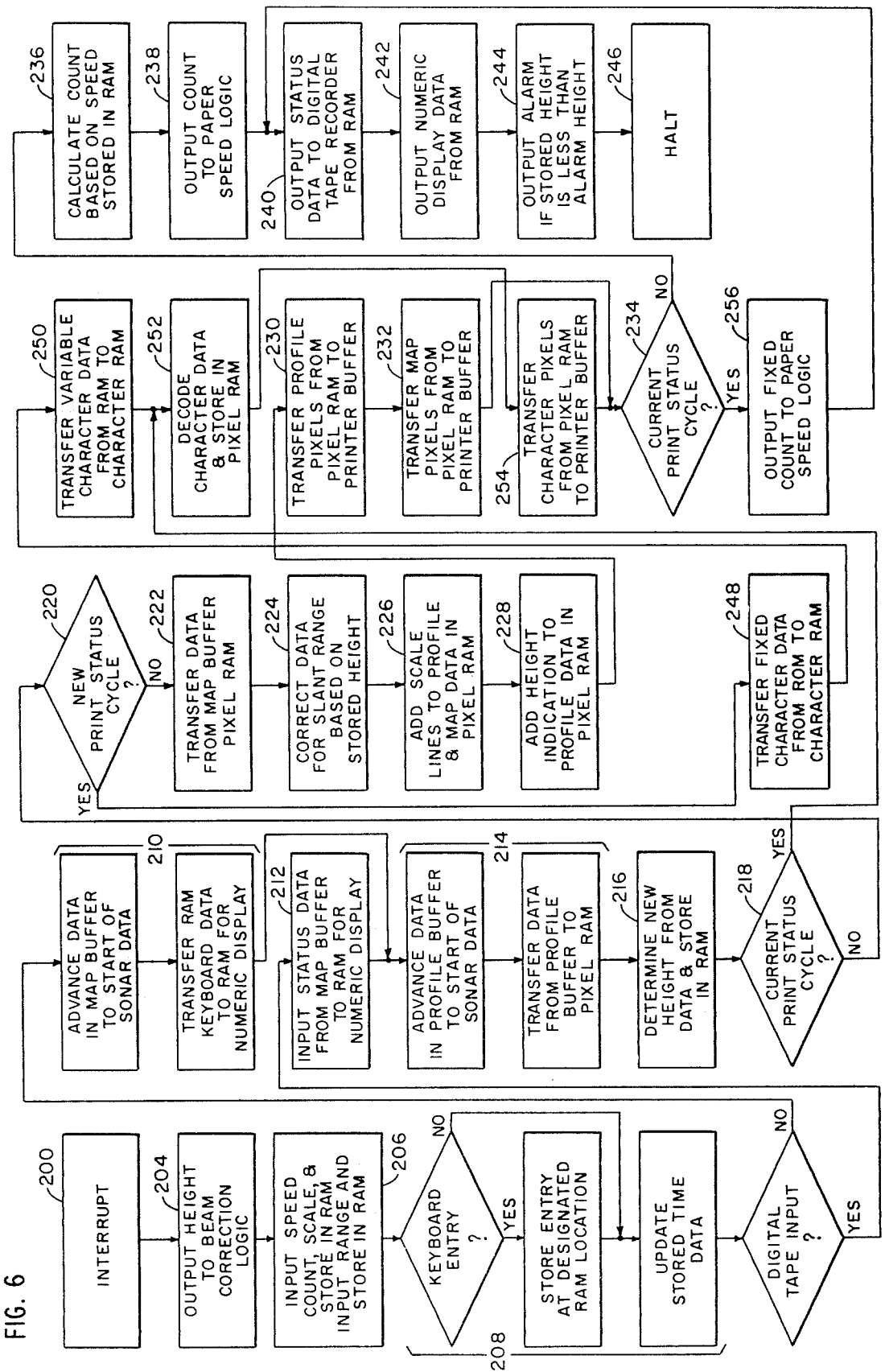
FIG. 6 is a flow chart of the operation of the microprocessor according to the illustrated embodiment.

Having thus described the general operating system according to the invention, the detailed operation of the microprocessor will be described with respect to the flow diagram of FIG. 6. At the beginning of each measurement cycle, the microprocessor receives an inter- rupt signal, at 200, which initiates operation of the processor according to its stored program. The interrupt may come from either the decoder 99 over line 71 (if either the analog tape recorder or the tow fish is the source of the data) or from the sample generator 115 over a line 202 (if the digital tape recorder is the source of the measurement cycle). The microprocessor thereafter provides, to angle correction element 118 over lines 135, binary data corresponding to the height of the tow fish above the seabed. This is indicated at 204.

If the data source is either the tow fish or the analog tape recorder, the output of velocity counter 70 over line 71a and the range setting from the control panel over lines 34 are read and stored in a microprocessor random access memory (RAM). This is indicated at 206. The programmed microprocessor then checks the control panel for entry of additional data, which, if available, is stored in designated RAM locations and thereafter the microprocessor updates the stored time data. This is indicated at 208.

If the digital tape recorder is not the input source, the data stored in the storage register 117, hereinafter referred to as the MAP buffer, is advanced (shifted) to the beginning of the sonar data; and the data read and entered from the keyboard and stored in the random access memory is transferred to a portion of the RAM reserved for numeric display. This is indicated at 210. On the other hand, if the digital tape is providing the data input, the input status data is taken from the beginning portion of the MAP buffer and is stored in that portion of the RAM which is reserved for numeric display output. This is indicated at 212.

Next, the data which is in dual shift register 116, hereinafter referred to as the profile buffer, is advanced to the start of the three bit sonar data and the sonar data from the profile buffer is transferred to a portion of the random access memory designated PIXEL RAM. This is indicated at 214. The microprocessor then determines a new height from the data received from the profile buffer and stores that determination in the random access memory. It will be recalled that the new height is determined from the binary output sequence of bottom detection logic element 128 which is stored in the profile register, register 116. This is indicated at FIG. 6 at 216.

In the illustrated embodiment of the invention, the microprocessor has two operating modes. In the first mode of operation, the received and sampled sonar data signals are output to the printer buffer for display on the graphics printer. In the second mode of operation, status information, in the form of alphanumerics, are formatted and provided to the printer buffers, for display by the graphics printer. The status information would include, as noted earlier in this description, velocity, time, range, etc. In the illustrated embodiment, the two modes of operation cannot take place simultaneously and, as shall become clear below, the initiation of a "print status information" cycle takes precedence over the display of the sonar data.

Referring again to FIG. 6, after the height has been determined and stored in the RAM (at 216), and if the processor is not in the middle of a print status information cycle, that is, the processor is not in the middle of providing alphanumerics information to the printer (the test being indicated at 218) and if a new print status information cycle is not being initiated (the test being indicated at 220), then the side scan sonar data is assembled, formatted, and provided to the graphics printer as follows. The sonar data stored in the MAP buffer is transferred to the "PIXEL" portion of the random access memory. This is indicated at 222. That data is corrected as described in detail below for the nonlinear effect of the slant range as indicated at 224 and scale lines are superimposed upon both the profile and MAP data which is available in the PIXEL portion of the random access memory. This is indicated at 226. The scale lines aid in reading the resulting graphical representation. Next, a height indication is superimposed upon the profile data, which is in the PIXEL portion of the random access memory, to designate the position of the tow fish with respect to the seabed and provide a visual aid to determine whether the apparatus has properly identified the seabed. This is indicated at 228.

The profile picture elements are then transferred from the PIXEL portion of the random access memory to the printer buffer and thereafter the MAP picture elements are transferred from the PIXEL portion of the random access memory to the printer buffer. This is designated at 230, 232.

As noted above, it is assumed that the print status information cycle is not the operative mode and therefore at the decision branch 234, the "NO" branch is taken and the velocity of the tow fish, calculated by scaling the output of the velocity counter, is used to generate a line count. That line count indicates the number of times which the data just output to the printer buffer will be repeated during the next measurement cycle and that count is stored in the random access memory. This is designated at 236. Thereafter the count is transferred to the printer controller as indicated at 238.

Next, the stored status data is transferred to the status register 102 for later transfer to the digital tape recorder. This is indicated at 240. In the illustrated embodiment the numeric display data is output from the RAM to a numeric display indicating device on the apparatus (indicated at 242) and an output alarm is sounded if the stored height is less than a preset alarm height. This is indicated at 244. A sounded alarm indicates that the tow fish is dangerously close to the seabed. Thereafter, the microprocessor halts or waits, as indicated at 246 for the next interrupt.

If, while sonar data is being displayed, the print status information push button (not shown) on the front control panel of the apparatus is depressed, a print status cycle is initiated. During the print status cycle, in the illustrated embodiment, a single line of status data in alphanumeric characters is printed. Each alphanumeric character is formed in a 7×9 dot matrix as is well known in the art.

After the print status cycle is initiated, the "YES" branch of the decision indicated at 220 is taken, and the character data which is fixed in the microprocessor, such as, for example, the words "speed", "time", etc. are transferred from a read only memory (ROM) to a portion of the random access memory designated the character portion. This is indicated at 248.

Thereafter, the variable (or changing) character data which is input to the microprocessor from either the digital tape recorder or other input means such as the front panel, is transferred from its storage location in the RAM to designated addresses in the character portion of the RAM. Next, the character data is decoded to form a sequence of "ones" and "zeros" representing one of the nine lines which form the character; and that data is stored in the PIXEL portion of the random access memory. This is designated at 252.

After the character data has been stored in the PIXEL portion of the random access memory, it is transferred to the printer buffer 172 as indicated at 254 and, since the processor is still in a print status information cycle, the next step is to output a fixed count to the printer controller 170. This is indicated at 256. Thereafter, the housekeeping operations indicated at blocks 240, 242, and 244 are performed.

If a print cycle had been initiated previously, then the "YES" branch of the current print status cycle test at 218 is taken and the character data, already having been stored in the character portion of the RAM, is decoded to form the next output line and is stored in the PIXEL portion of the random access memory. This is indicated at 252.

Thereafter, the character portion in the PIXEL portion of the RAM is transferred to the printer buffer as indicated at 254 and processing continues in the same manner described in connection with a new print status information cycle.

Having thus described a preferred flow chart for the microprocessor operation, it is well within the skill of one skilled in the programming art to derive a program for controlling the processor according to the flow chart. In addition, any of many other embodiments for implementing the functional operations defined in the flow chart of FIG. 6 will be obvious to those skilled in the programming art. The embodiments will in general include hardware and software (or combinations thereof) implementations.

With respect, in particular, to the block 224, the detailed implementation, be it in hardware or software, is critical if the system is to operate in real time. As a result, the incoming port and starboard data are processed, as described in detail below, to avoid time-consuming calculations.

As is well known in the art, the incoming sampled port and starboard data, which have previously been sampled at a fixed sample rate, represent return signals from a sequence of locations on the seabed wherein adjacent locations are not spaced equi-distant from each other. The apparatus therefore provides (FIG. 6 at block 224) an apparaus and method for forming a sequence of sampled port and starboard data wherein adjacent data values always correspond to equi-distant locations on the seabed. This provides a linear planar map in the direction normal to tow fish travel.

Port and Starboard Data Processing

In the illustrated embodiment, the method and apparatus operate in real time. It is therefore important to reduce the complexity of any operation, for example, to avoid time consuming multiplication and square root calculations wherever possible. To this end, an iterative method for reformatting the incoming sampled port and starboard data, that is, for correcting the data for slant range, in real time, is employed. The illustrated iterative method does not require the mathematical operations of multiplication of taking the square root and corresponds to block 224 of FIG. 6.

This method, which corrects the data in a direction parallel to the horizontal plane and normal to the direction of movement of the tow fish, has the following method steps.

Figure 3:
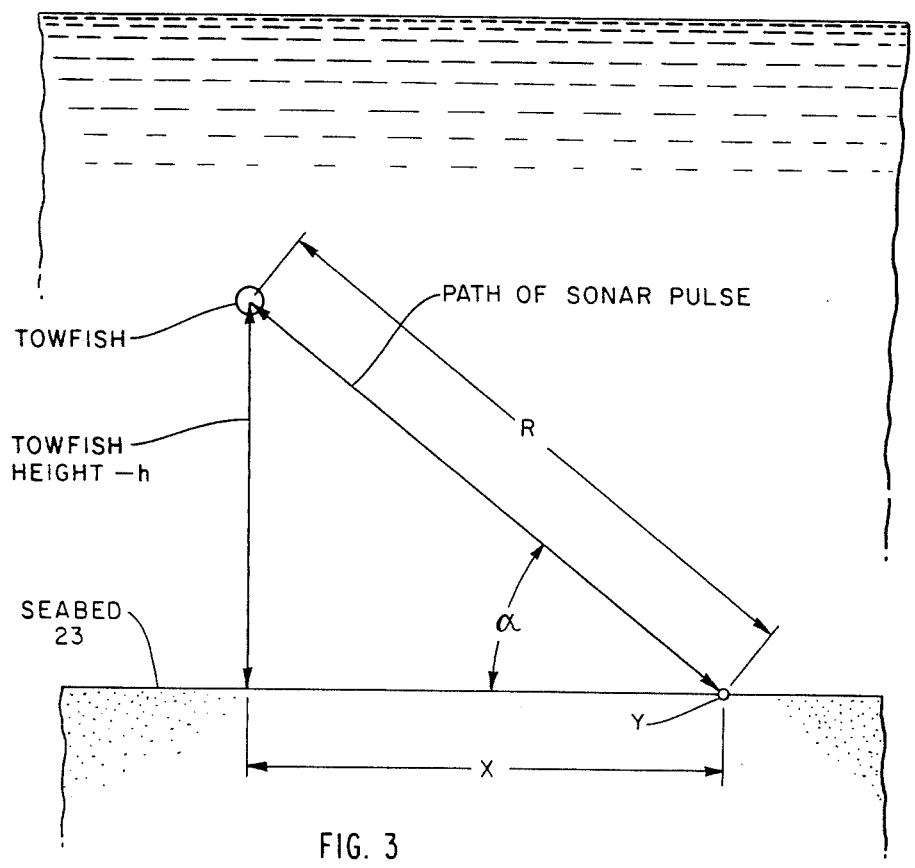
FIG. 3 is a schematic representation mapping of the relationship between the two fish and a signal return location on the seabed.

Referring to FIG. 3, the horizontal component of the distance, between the tow fish and a point on the seabed, designated "Y", from which a return signal is being received, is labelled "X"; the straight line distance from the tow fish to the seabed at point Y is labelled "R"; and the height of the tow fish above the seabed is labelled "H". The relationship between X, R, and H, is: $H^2 + X^2 = R^2$.

The illustrated method begins by noting that when $R = H$, $X = 0$. This corresponds to the first valid data sample. According to the illustrated method, the next data sample, corresponding to a range $R = H + \Delta r$, is selected to be and is set equal to the received amplitude for all $0 < X \leq X_1$ where $(X_1)^2 = (H + \Delta r)^2 - H^2$, where $\Delta r$ is the additional increment of range between the first and second valid samples of data. ($\Delta r$ equals $v_w T/2$, where $v_w$ is the velocity of sound in water and t equals the time between sample pulses. The value of the next data sample is then selected to represent the received amplitude for $X_1 < X \leq X_2$ where $(X_2)^2 = (H + 2\Delta r)^2 - H^2$. This procedure continues for all of the data samples.

In this illustrated embodiment, the data processing system is digital. Thus, there will be, for example, 900 received sample values derived from the port and 900 received sample values derived from the starboard transducers. In addition, the illustrated printer can resolve 800 points in the horizontal for each of the port and starboard directions. Thus, if the actual height of the tow fish is h, the system can be scaled to integer relationships by generating $$H = h \cdot (900)/(\text{RANGE}) \qquad \text{(EQUATION 1)}$$

where (RANGE) equals the range set by front panel control 33.

Using H as defined in Equation 1, $R = H, H+1, \ldots, 899-H$ and X assumes the values $0, 1, \ldots, 799$, which correspond to the discrete points of the printer line. If an error term, e, is defined as:

$$e = H^2 + X^2 - R^2, \qquad \text{(Equation 2)}$$

The following method can be implemented. Referring to Equation 2, the value of "e" when valid the port and starboard measurement data from the seabed is first received, is known because H equals R and X equals O. If R is incremented by "one" (to its next value, corresponding to the next data sample), "e" changes to a negative value. The error term "e", remains negative until the horizontal distance term "X" is incremented to an integer value greater than $\sqrt{R^2 - H^2}$. Thus, so long as the value of "e" is negative, the value of just received port and starboard data samples are repeated for each "X" in the displayed line; however, when "e" becomes non-negative, the next incoming data sample is used. This iterative process provides the means and method by which the linear map is generated from the input data in a direction normal to the tow fish movement.

Equation 2, however, contains three time consuming multiplications, and thus requires considerable calculation time. However Equation 2 can be rewritten as:

$$e = \sum_{j=1}^{X} (2j - 1) - \sum_{i=H+1}^{R} (2i - 1) \qquad \text{(Equation 3)}$$

Equation 3 provides a computationally faster approach to generaing the error function "e" in an iterative fashion. However, working through the identifies, Equation 3 can be rewritten as:

$$e = 2\left[\sum_{j=1}^{X} j\right] - X - 2\left[\sum_{i=H+1}^{R} i\right] + (R - H) \quad \text{(Equation 4)}$$

or $$e = 2\left[\sum_{j=1}^{X} j - \sum_{i=H+1}^{R} i\right] + R - (H + X). \quad \text{(Equation 5)}$$

Now define $$e' = 2\left[\sum_{j=1}^{X} j - \sum_{i=H+1}^{R} i\right] \quad \text{(Equation 6)}$$

and $$E = e - e' = R - (H + X). \quad \text{(Equation 7)}$$

Since $R - H$ is always less than X, the difference error E is always less than 2X. That means, that the error in estimating "e" by using the function "e'" is always less than 2X. Furthermore, "e'" will change by a minimum of 2X for any new value of R or X, and therefore the approximation e' will not cause an error greater than 1 in either R or X. Thus, the error function e' can be used in the iterative procedure to further increase the system speed without introducing an unacceptable degradation in accuracy.

Figure 7:
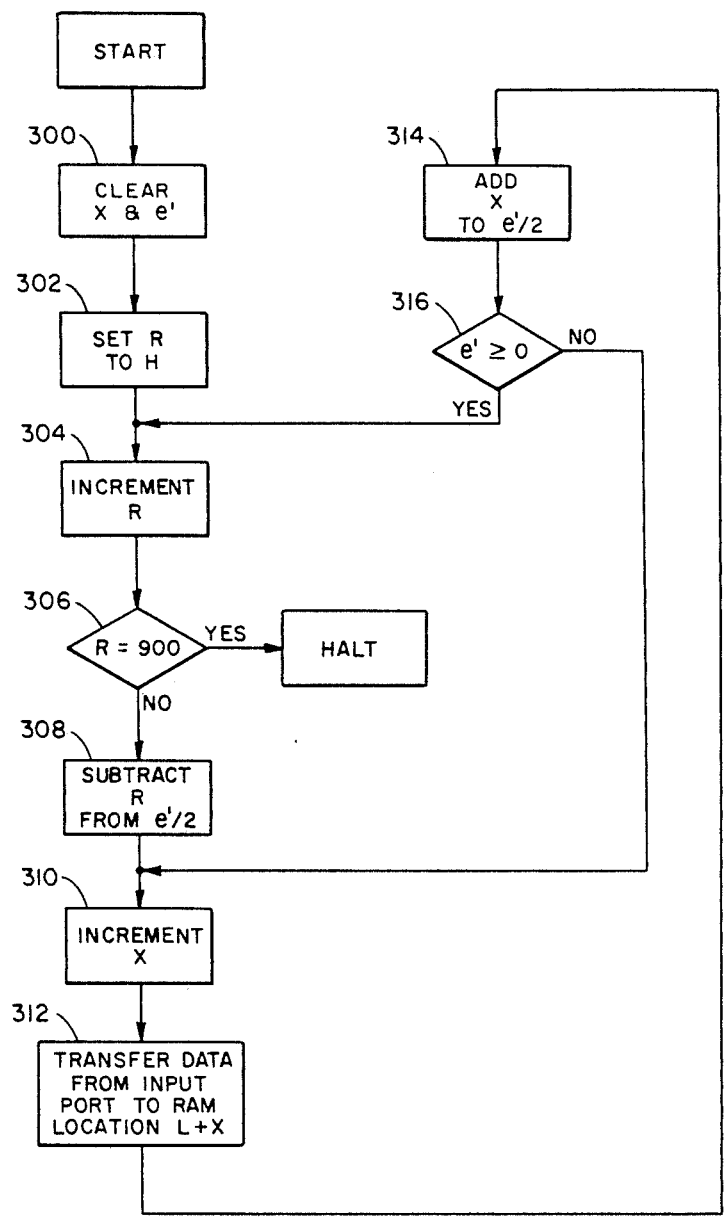
FIG. 7 is a flow chart detailing a method of operation for providing slant range correction.

The following iterative procedure can thus advantaeously be used. Referring to the flow diagram of FIG. 7, after the scaled height H has been determined, the initial values of R (=H) and X (=O) are set. This is designated at 300 and 302. The value of R is incremented (at 304) and if the new value of R is not beyond the last position of the sampled data, there are 900 samples in the illustrated embodiment, (this test being designated at 306), Equation 6 is recalculated by subtracting R from e'/2. This is designated at 308. "e'" will now be negative. Thereafter, "X" is incremented by "one" (at 310); and the new port and starboard samples corresponding to the present value of R are stored in positions corresponding to the incremented value of "X" (at 312). The present value of "X" is added to the error term e'/2 (at 314) and if e' is non-negative (at 316), "R" is incremented by one and the procedure oulined above continues. If e' is negative, "X" is incremented by one and the sample values still corresponding to the "old" R, are stored in the location corresponding to the new value of "X". The error term e' is recalculated (at 314) and e' is tested again (at 316). In this manner, the input data is reformatted to provide, for each scan line, a linear line mapping of the seabed topography.

With respect to the direction of tow fish travel, the velocity input from the tow fish provides the necessary information to determine how many times the same scan line must be repeated (the line count) to provide a linear map in that direction.

At this point of the description the flow of a block of data from shift register 117 to printer 174 shall be described. Referring to FIG. 5, during a measurement cycle determined by the time $T_t$ between trigger pulses, a block of data is read into the microprocessor from register 117, for example, the block labelled 409 (line (e)). That block of data is processed within the microprocessor and the procesed block, 410, is output during the same measurement cycle to the printer buffer as indicated in FIG. 5 (line (f)). Simultaneously, a block of data 411, previously received from the microprocessor, is being printed by the printer (FIG. 5, line (h)). Each block of data is printed, as noted above, a number of times equal to the microprocessor supplied line count; and a print pulse 412, provided over line 182, initiates each printing cycle. Thus, as shown on lines (h) and (i) of FIG. 5, a block of data in buffer 172 may be printed once or twice, and in general any required number of times within the system time limitations.

The microprocessor 72 thus processes the input data over lines 158 and 132 to determine, during each measurement cycle, the tow fish height and the slant range corrections. From this information, and the assumption that the bottom is flat and horizontal, the original data is reformatted (i.e. repeated at those discrete horizontal positions, between sampled data measurement points) and is applied to the printer buffer register. The height measurement, as noted above, is made available over lines 135 to the angle correction circuit 118 to provide grazing angle and side lobe correction.

As noted above, use of a microprocessor to perform some of the numeric calculations is an arbitrary choice. Special purpose hardware could also be implemented to perform similar calculations and in the alternative, some of the hardware implemented operations shown in FIG. 2 could be implemented in the microprocessor or on a general or special purpose computer. Thus, the microprocessor itself forms no part of the present invention.

Additions, subtractions, deletions, and other modifications of the above described preferred embodiment of the invention will be obvious to those skilled in the art and are within the scope of the following claims.

What is claimed is:

1. a display apparatus for displaying successive lines of data comprising
    storage means for storing each successive line of data,
    means for forming a line count associated with each line of data,
    means for storing said formed line count, and
    means for displaying each successive line of data in a number of successive lines of said display, said number corresponding to said stored line count.

2. The display apparatus of clam 1 wherein said storage means comprises
    first and second storage registers, each storage register having means for receiving and storing said data and for making said lines of data available for reading, and said registers being connected so that when one of said registers is storing data, the other register makes its contents available for reading.

* * * * *

UNITED STATES PATENT AND TRADEMARK OFFICE
CERTIFICATE OF CORRECTION

PATENT NO. : 4,445,186
DATED : April 24, 1984
INVENTOR(S) : Roger L. Caron et al.

It is certified that error appears in the above-identified patent and that said Letters Patent are hereby corrected as shown below:

Column 1, line 36, "Appreication" should be --Appreciation--.

Column 2, line 11, "enchancing" should be --enhancing--.

Column 2, line 14, "methods" should be --method--.

Column 2, line 15, "producingg" should be --producing--.

Column 3, line 3, "measurments" should be --measurements--.

Column 3, line 17, "featues" should be --features--.

Column 3, line 29, "dispaly" should be --display--.

Column 4, line 16, "desciption" should be --description--.

Column 4, line 26, "two" should be --tow--.

UNITED STATES PATENT AND TRADEMARK OFFICE
CERTIFICATE OF CORRECTION

PATENT NO. : 4,445,186

DATED : April 24, 1984

INVENTOR(S) : Roger L. Caron et al.

It is certified that error appears in the above-identified patent and that said Letters Patent are hereby corrected as shown below:

Column 5, line 20, "microporcessor" should be --microprocessor--.

Column 5, line 23, "duites" should be --duties--.

Column 5, line 41, "tarnsfer" should be --transfer--.

Column 5, line 66, "two" should be --tow--.

Column 6, line 12, "ampplifiers" should be --amplifiers--.

Column 6, line 21, "data" should be --date--.

Column 7, line 25, "microprocess" should be --microprocessor--.

Column 8, line 6, "aboe" should be --above--.

Column 8, lines 22 and 23, "inter alia" should be --*inter alia*--.

Column 8, line 24, "vlocity" should be --velocity--.

Column 8, line 35, "ilustrated" should be --illustrated--.

UNITED STATES PATENT AND TRADEMARK OFFICE
CERTIFICATE OF CORRECTION

PATENT NO. : 4,445,186  
DATED : April 24, 1984  
INVENTOR(S) : Roger L. Caron et al.

page 3 of 5

It is certified that error appears in the above-identified patent and that said Letters Patent are hereby corrected as shown below:

Column 8, line 52, "od" should be --of--.

Column 8, line 55, "flat" should be --flag--.

Column 8, line 65, "ltaer" should be --later--.

Column 10, line 1, "grahics" should be --graphics--.

Column 10, line 32, "reflectios" should be --reflections--.

Column 10, line 45, "an" should be --on--.

Column 10, line 54, "two" should be --tow--.

Column 11, line 17, "otehrwise" should be --otherwise--.

Column 11, line 31, "mmeory" should be --memory--.

Column 11, line 37, "otput" should be --output--.

UNITED STATES PATENT AND TRADEMARK OFFICE
CERTIFICATE OF CORRECTION

PATENT NO. : 4,445,186

DATED : April 24, 1984

INVENTOR(S) : Roger L. Caron et al.

It is certified that error appears in the above-identified patent and that said Letters Patent are hereby corrected as shown below:

Column 11, line 43, "multilpication" should be --multiplication--.

Column 11, line 45, "lies" should be --lines--.

Column 12, line 1, "Microrpocessor" should be --Microprocessor--.

Column 15, line 45, "apparaus" should be --apparatus--.

Column 15, line 61, "of" should be --or--.

Column 16, line 14, "T" should be --t--.

Column 16, line 67, "generaing" should be --generating--.

Column 17, line 28 (second occurrence), "e" should be --e'-- .

Column 17, line 36, "advantaeously" should be --advantageously--.

Column 17, line 53, "oulined" should be --outlined--.

UNITED STATES PATENT AND TRADEMARK OFFICE
CERTIFICATE OF CORRECTION

PATENT NO. : 4,445,186

DATED : April 24, 1984

INVENTOR(S) : Roger L. Caron et al.

It is certified that error appears in the above-identified patent and that said Letters Patent are hereby corrected as shown below:

Column 18, line 10, "procesed" should be --processed--.

In the Claims:

Claim 1, column 18, line 1, "a" should be --A--.

Claim 2, column 18, line 55, "clam" should be --claim--.

Signed and Sealed this

Eleventh Day of September 1984

[SEAL]

Attest:

GERALD J. MOSSINGHOFF

Attesting Officer

Commissioner of Patents and Trademarks